United States Patent
Lee et al.

(10) Patent No.: US 7,827,126 B2
(45) Date of Patent: Nov. 2, 2010

(54) METHOD FOR CHANGING EMOTION OF SOFTWARE ROBOT

(75) Inventors: Kang-Hee Lee, Seoul (KR); Kwang-Choon Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 652 days.

(21) Appl. No.: 11/850,515

(22) Filed: Sep. 5, 2007

(65) Prior Publication Data

US 2008/0059393 A1 Mar. 6, 2008

(30) Foreign Application Priority Data

Sep. 5, 2006 (KR) .................. 10-2006-0085367

(51) Int. Cl.
  *G06F 15/18* (2006.01)
  *G05B 19/04* (2006.01)
  *G06F 17/00* (2006.01)

(52) U.S. Cl. .................. 706/14; 700/245; 700/264; 455/218; 701/1; 607/54

(58) Field of Classification Search .................. 706/14, 706/47; 455/218; 607/54; 701/1; 700/246, 700/245

See application file for complete search history.

(56) References Cited

U.S. PATENT DOCUMENTS

2006/0149428 A1* 7/2006 Kim et al. .................. 701/1

FOREIGN PATENT DOCUMENTS

| KR | 1020010052699 | 6/2001 |
| KR | 1020030059917 | 7/2003 |
| KR | 1020050028171 | 3/2005 |

* cited by examiner

*Primary Examiner*—Donald Sparks
*Assistant Examiner*—Ola Olude Afolabi
(74) *Attorney, Agent, or Firm*—The Farrell Law Firm, LLP (57) ABSTRACT

Disclosed is a method for changing emotion of a software robot (sobot) in a sobot terminal. The sobot terminal includes a short-term memory unit and a long-term memory unit. When an emotional change occurs during the operation of the short-term memory unit, the sobot terminal stores a short-term reference emotion value of the corresponding emotion in the long-term reference memory. When the operation time of the long-term memory unit elapses, the sobot terminal resets the long-term reference emotion value using the short-term reference emotion values stored in the long-term memory unit. The sobot terminal can change the emotion of the sobot more naturally through the above process.

6 Claims, 11 Drawing Sheets

| EMOTIONAL CHANGE | REFERENCE EMOTION VALUE OF FURY | | |
|---|---|---|---|
| ANGER → FURY | ⑤ (601) → 4 | CHANGE THE REFERENCE EMOTION VALUE OF FURY DURING TIME T₁ | |
| ANGER → FURY | 4 → 3 | | |
| ANGER → FURY | 3 → 2 | | |
| ANGER → FURY | 5 → 4 | CHANGE THE REFERENCE EMOTION VALUE OF FURY DURING TIME T₂ | |
| ANGER → FURY | 4 → 3 | | |
| ANGER → FURY | 5 → 4 | CHANGE THE REFERENCE EMOTION VALUE OF FURY DURING TIME T₃ | CHANGE THE REFERENCE EMOTION VALUE OF FURY DURING TIME Tₐ |
| ANGER → FURY | 4 → 3 | | |
| ANGER → FURY | 3 → 2 | | |
| ANGER → FURY | 2 → 1 | | |
| ANGER → FURY | 5 → 4 | CHANGE THE REFERENCE EMOTION VALUE OF FURY DURING TIME T₄ | |
| ANGER → FURY | 4 → 3 | | |
| ANGER → FURY | 3 → 2 | | |
| ANGER → FURY | ④ (603) → 3 | CHANGE THE REFERENCE EMOTION VALUE OF FURY DURING TIME T₁ | CHANGE THE REFERENCE EMOTION VALUE OF FURY DURING TIME Tₐ |
| ANGER → FURY | 3 → 2 | | |
| ... | ... | ... | ... |

| EMOTIONAL CHANGE | REFERENCE EMOTION VALUE OF FURY | | |
|---|---|---|---|
| EQUILIBRIUM → JOY | 3 (901) → 4 | CHANGE THE REFERENCE EMOTION VALUE OF JOY DURING TIME $T_1$ | |
| EQUILIBRIUM → JOY | 4 → 5 | | |
| EQUILIBRIUM → JOY | 5 → 6 | | |
| EQUILIBRIUM → JOY | 3 → 4 | CHANGE THE REFERENCE EMOTION VALUE OF JOY DURING TIME $T_2$ | |
| EQUILIBRIUM → JOY | 4 → 5 | | |
| EQUILIBRIUM → JOY | 3 → 4 | CHANGE THE REFERENCE EMOTION VALUE OF JOY DURING TIME $T_3$ | CHANGE THE REFERENCE EMOTION VALUE OF JOY DURING TIME $T_a$ |
| EQUILIBRIUM → JOY | 4 → 5 | | |
| EQUILIBRIUM → JOY | 5 → 6 | | |
| EQUILIBRIUM → JOY | 6 → 7 | | |
| EQUILIBRIUM → JOY | 3 → 4 | CHANGE THE REFERENCE EMOTION VALUE OF JOY DURING TIME $T_4$ | |
| EQUILIBRIUM → JOY | 4 → 5 | | |
| EQUILIBRIUM → JOY | 5 → 6 | | |
| EQUILIBRIUM → JOY | 4 (903) → 5 | CHANGE THE REFERENCE EMOTION VALUE OF JOY DURING TIME $T_1$ | CHANGE THE REFERENCE EMOTION VALUE OF JOY DURING TIME $T_a$ |
| ... | ... | ... | ... |

FIG.10

METHOD FOR CHANGING EMOTION OF SOFTWARE ROBOT

PRIORITY

This application claims priority to an application entitled "Method for Changing Emotion of Software Robot" filed with the Korean Intellectual Property Office on Sep. 5, 2006 and assigned Serial No. 2006-85367, the contents of which are incorporated herein by reference.

BACKGROUND OF THE INVENTION

1. Field of the Invention

The present invention relates generally to a software robot, and more particularly to a method for changing the emotion of a software robot.

2. Description of the Related Art

A software robot is a software-based virtual robot having a life cycle similar to a living creature the ability to communicate with an object in the real world. It has the further ability to move within a communication network and connect to other systems at any time and place. The software robot can recognize a situation by itself and seamlessly interact with a user. It can also learn various behavior patterns through the recognition of situations and the interactions with the user. A software robot is often called a "sobot."

A sobot terminal having a sobot incorporated therein can output an emotional image of the sobot which is determined by the user's input. For example, while the sobot is in the state of emotional equilibrium, the user may press a "pet" key provided on the terminal several times, to generate a stimulus value corresponding to the pressings of the "pet" key. The generated stimulus value is applied to an emotion value of joy, which is the emotion corresponding to the "pet" stimulus, thereby increasing the emotion value of joy. When the increased emotion value of joy is greater than a reference emotion value of joy, the sobot terminal outputs an image representing the joyful emotion of the sobot.

In other words, the emotion of the sobot changes when an emotion value of a specific emotional state is greater than a reference emotion value. The emotional changes of the sobot, however, are mechanical because reference emotion values of diverse emotional states are fixed and unchangeable in a conventional sobot terminal. Accordingly, the user is not likely to sympathize during communication with the sobot.

Also, in conventional sobot terminals, an emotional change generated during communication between the user and the sobot cannot be reapplied to the sobot.

SUMMARY OF THE INVENTION

Accordingly, the present invention has been made to solve the above-mentioned problems occurring in the prior art, and an object of the present invention is to provide a method for changing emotion of a sobot, without arousing feelings of rejection which may be experienced during communication with a sobot changing its emotion mechanically.

Another object of the present invention is to provide a method for changing emotion of a sobot and applying results of the emotional change to the sobot.

In order to accomplish the above objects of the present invention, there is provided a method for changing emotion of a sobot, including generating stimulus data corresponding to a user's input, increasing an emotion value representing the current emotion of the sobot according to the stimulus data generated during a period of time, if the increased emotional value is greater than a preset short-term reference emotion value, recognizing that the sobot is experiencing the emotion corresponding to the increased emotion value, storing the short-term reference emotion value both in a short-term memory unit and in a long-term memory unit, changing and resetting the short-term reference emotion value, if a condition for terminating the operation of the short-term memory unit is not met, repeating the steps of increasing the emotion value and resetting the short-term reference emotion value, if the condition for terminating the operation of the short-term memory unit is met, initializing the short-term reference emotion value to be equal to a previously stored long-term reference emotion value, if a condition for terminating the operation of the long-term memory unit is not met, repeating the steps of increasing the emotion value, resetting the short-term reference emotion value and initializing the short-term reference emotion value, and if the condition for terminating the operation of the long-term memory unit is met, calculating the long-term reference emotion value using at least one reference emotion value stored in the long-term memory unit and storing the calculated long-term reference emotion value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. Descriptions of well-known functions and constructions are omitted for the sake of clarity and conciseness.

Figure 1:
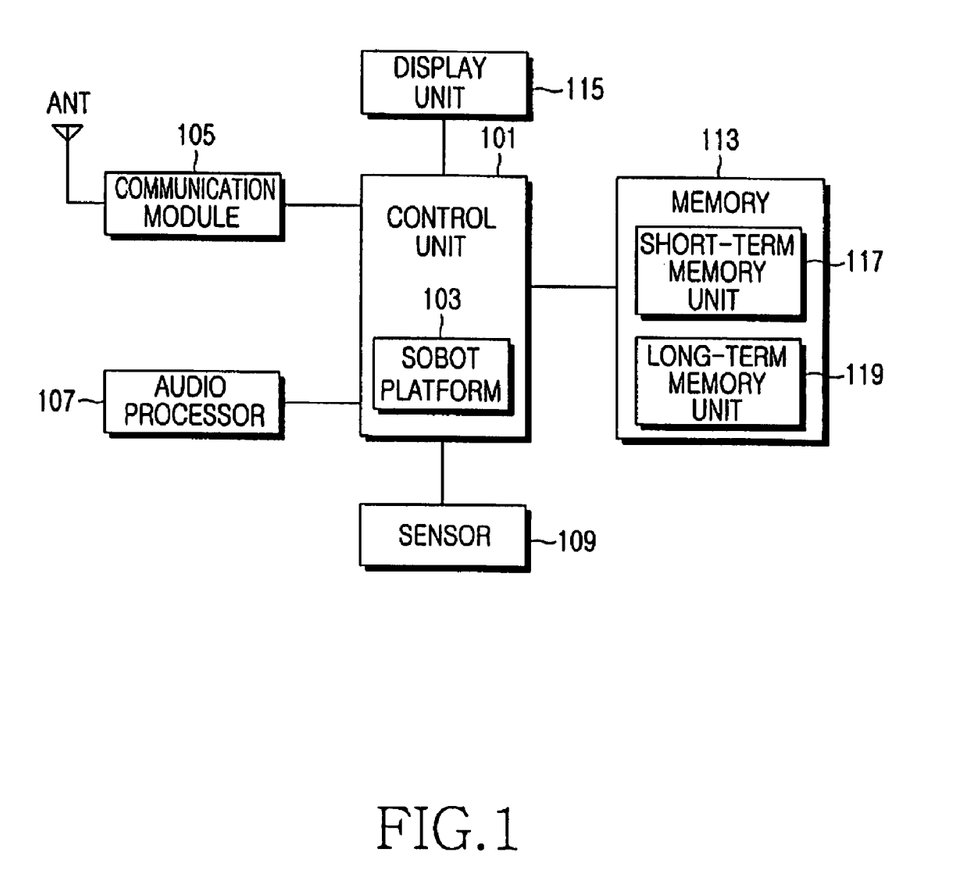
FIG. 1 is a block diagram of a sobot terminal according to a preferred embodiment of the present invention.

FIG. 1 is a block diagram of a sobot terminal according to the present invention. A sobot terminal is a device having a sobot platform and implementing a sobot, using the platform.

The sobot terminal according to the present invention includes a control unit 101, a communication module 105, an audio processor 107, a sensor 109, a key input unit 111 (not shown), a memory 113 and a display unit 115.

The communication module 105 implements a function for communication between the sobot terminal and an external device. The sobot terminal can send or receive data to or from the external device through the communication module 105. The audio processor 107 converts an audio signal into audible sound and outputs the sound. The sensor 109 receives external stimulus and outputs the received stimulus to the control unit 101. For example, if the sensor 109 is a camera, it takes a picture as data and outputs the data to the control unit 101. The key input unit 111 is provided with a plurality of keys for implementing various functions. The key input unit 111 generates a signal corresponding to a key pressed by the user and outputs the signal to the control unit 101. The display unit 115 displays a sobot image, as well as the current mode and operational state of the sobot terminal, under the control of the control unit 101. The display unit 115 can include a Liquid Crystal Display (LCD) and Organic Light Emitting Diodes (OLEDs).

The memory 113 stores data necessary to control the functions of the sobot terminal. In accordance with the present invention, the memory 113 includes a short-term memory unit 117 for storing a short-term reference emotion value of each emotional state and a long-term memory unit 119 for storing a long-term reference emotion value of each emotional state.

A short-term reference emotion value is a reference point for changing the emotion of the sobot. A single short-term reference emotion value is set for each emotional state. Also, a short-term reference emotion value corresponding to a specific emotional state can be increased or decreased with the emotional change of the sobot. For example, a short-term reference emotion value corresponding to the joyful emotion of the sobot can be set to "5." If stimulus arousing joy is inputted by the user, the sobot terminal will increase an emotion value of the joyful emotion. If the increased emotion value is greater than a short-term reference emotion value of the joyful emotion, the sobot terminal will recognize that the current emotion of the sobot is joy. In addition, the sobot terminal will increase the short-term reference emotion value "5" corresponding to the joyful emotion by one and reset it to "6." Since the short-term reference emotion value of joy is increased, it will become more difficult to change the emotion of the sobot to joy.

A long-term reference emotion value is used to initialize the changed short-term reference emotion value. A single long-term reference emotion value is set for each emotional state. More specifically, when a condition for terminating the operation of the short-term memory unit 117 is met, the sobot terminal initializes the changed short-term reference emotion value to the corresponding long-term reference emotion value. Supposing that the short-term reference emotion value of joy is increased to "7" and that the corresponding long-term reference emotion value is "5," the sobot terminal will reset the short-term reference emotion value of joy to "5" when an operation time of the short-term memory unit 117 elapses.

The control unit 101 controls overall operations of the sobot terminal. In accordance with the present invention, the control unit 101 includes a sobot platform 103 for implementing a sobot and controlling the behavior patterns of the sobot.

Figure 2:
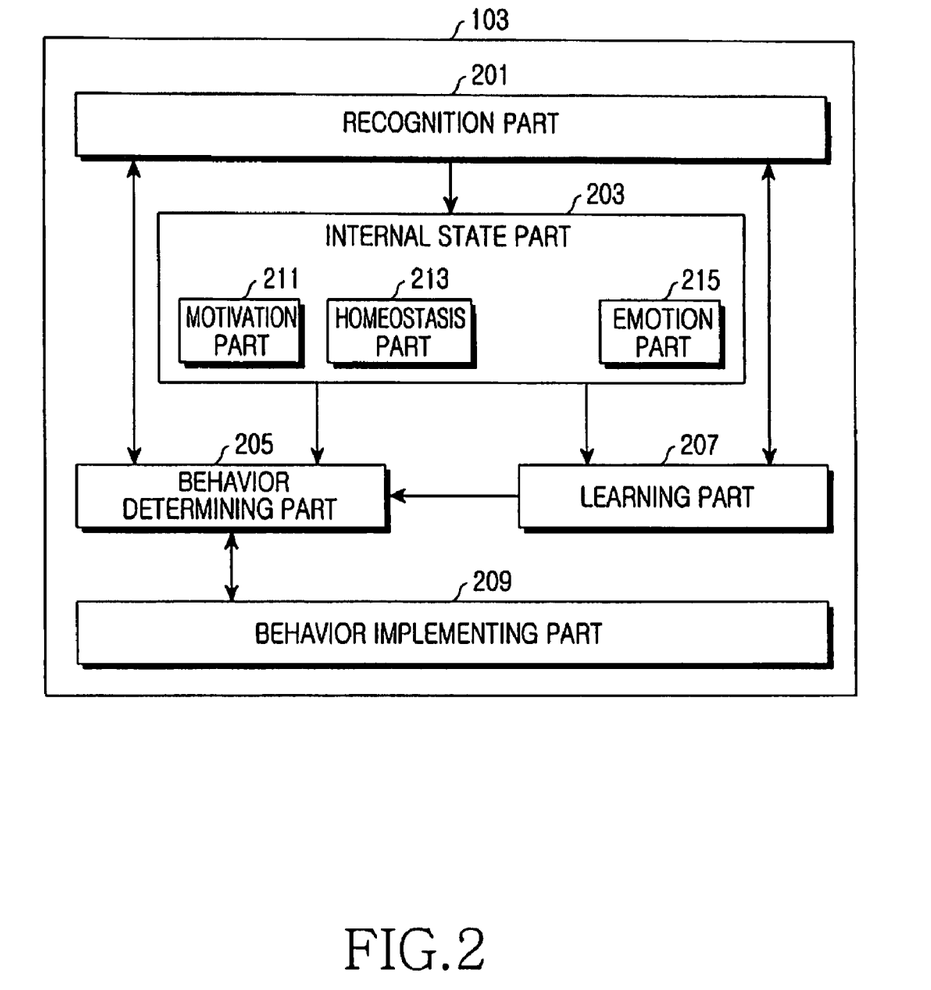
FIG. 2 is a block diagram of a software robot platform according to the present invention.

Referring to FIG. 2, the sobot platform 103 includes a recognition part 201, an internal state part 203, a behavior determining part 205, a learning part 207 and a behavior implementing part 209.

The recognition part 201 receives data corresponding to a stimulus inputted by the user, and outputs the received data to the internal state part 203, behavior determining part 205 and learning part 207. The recognition part 201 can receive key signal data inputted by the user or sensing data inputted from the sensor 109.

The behavior determining part 205 receives data associated with behavior determination from the recognition part 201 and the internal state part 203, and determines a proper behavior of the sobot based on the data. The learning part 207 includes a preference learning part and a speech learning part. The preference learning part finds out an interest of the sobot according to the stimulus inputted by the user, determines the preference of the sobot based on the interest, and outputs the preference to the behavior determining part 205. The speech learning part analyzes user speech data inputted from the audio processor 107 to find out a behavior desired by the user, determines the preference of the sobot according to the desired behavior, and outputs the preference to the behavior determining part 205. The behavior implementing part 209 implements the sobot according to the behavior pattern inputted from the behavior determining part 205.

The internal state part 203 includes a motivation part 211, a homeostasis part 213 and an emotion part 215. The motivation part 211 relates to internal factors determining a main behavior of the sobot, for example, desire for domination, desire for possession, desire for evasion, boredom, curiosity or affinity. The homeostasis part 213 relates to factors associated with survival, for example, hunger, fatigue and sleepiness. The emotion part 215 generates stimulus data according to the intensity of the stimulus inputted from the recognition part 201, detects an emotion value corresponding to the stimulus data, and applies the stimulus data to the detected emotion value to increase the emotion value. The emotion part 215 compares the increased emotion value with a corresponding short-term reference emotion value. When the current (increased) emotion value is greater than the short-term reference emotion value, the emotion part 215 recognizes the emotional state corresponding to the current emotion value as the predominant emotion of the sobot. For example, when receiving stimulus data corresponding to the joyful emotion from the recognition part 201, the emotion part 215 detects the current emotion value of the joyful emotion of the sobot and applies the received stimulus data to the current emotion value, thereby increasing the emotion value of the joyful emotion. Then, the emotion part 215 compares the increased emotion value with a short-term reference emotion value of the joyful emotion. If the increased emotion value is greater than the short-term reference emotion value, the emotion part 215 will recognize that the sobot is in the joyful emotional state.

Figure 3:
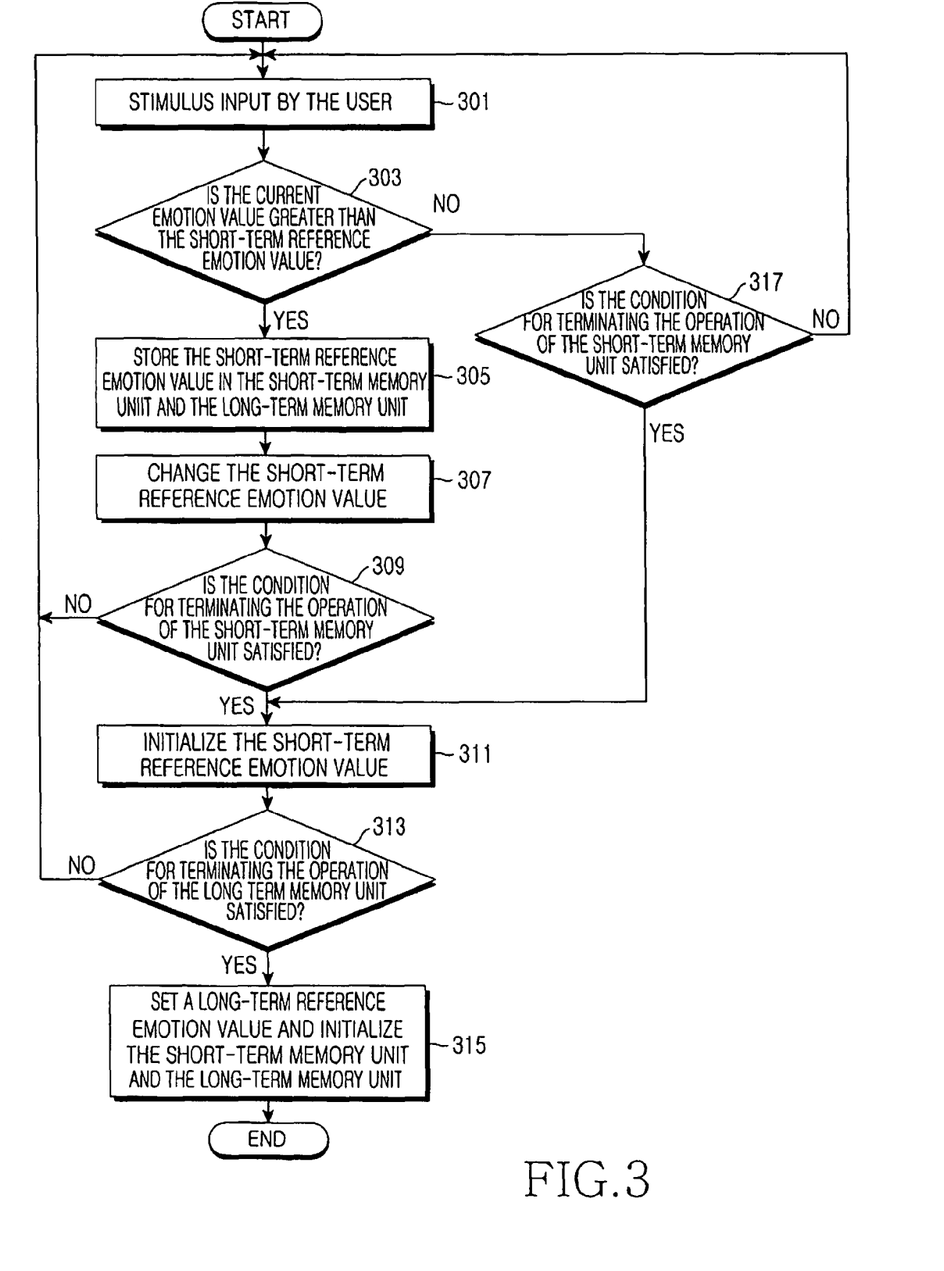
FIG. 3 is a flowchart showing a process of changing the emotion of a sobot according to the present invention.

FIG. 3 is a flowchart showing a process of changing the emotion of the sobot according to the present invention. This process will be explained in detail with reference to FIGS. 1 to 3.

The operation time of the short-term memory unit 117 is previously set. The emotion value of a specific emotional state of the sobot is increased by the application of stimulus data inputted by the user. The short-term memory unit 117 will operate if the increased emotion value is greater than a corresponding short-term reference emotion value. In other words, the control unit 101 activates the short-term memory unit 117 upon a change of emotion, and counts the operation time of the short-term memory unit 117. When the preset operation time elapses, the control unit 101 deactivates the short-term memory unit 117 until a next emotional change occurs. If the next emotional change occurs due to another stimulus data inputted by the user during the operation or activation of the short-term memory unit 117, the control unit 101 will change the short-term reference emotion value corresponding to the inputted stimulus data in a predefined emotion value changing manner. More specifically, if emotional changes occur several times during the operation of the short-term memory unit 117, the control unit 101 will change the short-term reference emotion value by the same number of times as the changes of emotion, and will store the changed short-term reference emotion value in the memory 113. When the preset operation time of the short-term memory unit 117 elapses, the control unit 101 will then initialize the current short-term reference emotion value.

The long-term memory unit 119 operates during a preset number of operations of the short-term memory unit 117. For example, the long-term memory unit 119 can be set to operate during four consecutive operations of the short-term memory unit 117. In such a case, the long-term memory unit 119 starts to operate with the first operation of the short-term memory unit 117, and stops operating after the fourth operation of the short-term memory unit 117. The control unit 101 can calculate a long-term reference emotion value of each emotional state based on a corresponding short-term reference emotion value stored in the long-term memory unit 119. The operation time of the long-term memory unit 119 is a period between the beginning of the first operation of the short-term memory unit 117 and the end of the preset last operation of the short-term memory unit 117. If the short-term memory unit 117 operates by the preset number of times, the control unit 101 will calculate a long-term reference emotion value of a specific emotional state using at least one short-term reference value stored in the long-term memory unit 119 during the operation of the long-term memory unit 119. The control unit 101 will store the calculated long-term reference emotion value in the memory 113 and initialize the long-term memory unit 119.

The operation times of the short-term memory unit 117 and the long-term memory unit 119 will be explained in more detail. Supposing that the long-term memory unit 119 is set to operate during four consecutive operations of the short-term memory unit 117, that each operation of the short-term memory unit 117 lasts three hours, and that the time interval between two successive operations of the short-term memory unit 117 is one hour, the operation time of the long-term memory unit 119 will be fifteen hours ((3×4)+(1×3)=15). Referring to FIG. 3, the control unit 101 detects when stimulus arousing a specific emotion is inputted by the user in step 301. The control unit 101 generates stimulus data including the intensity of the stimulus. Also, the control unit 101 acts to detect an emotion value corresponding to the generated stimulus data among a plurality of predefined emotion values stored in the memory 113. The control unit 101 applies a stimulus value generated by the user's input to the detected emotion value, thereby increasing the emotion value.

In step 303, the control unit 101 detects a corresponding short-term reference emotion value from the memory 113, and compares the increased emotion value with the short-term reference emotion value. If the increased emotion value is greater than the short-term reference emotion value, the control unit 101 will proceed to step 305. Otherwise, the control unit 101 will proceed to step 317.

In step 317, the control unit 101 determines whether the condition for terminating the operation of the short-term memory unit 117 is met. If the condition is not met, the control unit 101 will return to step 301. If the condition is met, the control unit 101 will proceed to step 311. For example, the condition for terminating the operation of the short-term memory unit 117 can be an operation time of the short-term memory unit 117. If the operation time of the short-term memory unit 117 has not elapsed, the control unit 101 will return to step 301. If the operation time has elapsed, the control unit 101 will proceed to step 311.

In step 305, the control unit 101 detects the current short-term reference emotion value and stores the detected short-term reference emotion value both in the short-term memory unit 117 and in the long-term memory unit 119.

In step 307, the control unit 101 increases or decreases the current short-term reference emotion value in a preset reference emotion value changing manner. Then, the control unit 101 stores the increased or decreased short-term reference emotion value in the memory 113. Supposing that the current short-term reference emotion value is "5" and that each short-term reference emotion value is set to be increased by one, the control unit 101 will increase the current short-term reference emotion value to "6" and store the increased short-term reference emotion value in the memory 113.

In step 309, the control unit 101 determines whether the condition for terminating the operation of the short-term memory unit 117 is met. If the condition is not met, the control unit 101 will return to step 301. If the condition is met, the control unit 101 will proceed to step 311. For example, the condition for terminating the operation of the short-term memory unit 117 can be an operation time of the short-term memory unit 117. If the operation time of the short-term memory unit 117 has not elapsed, the control unit 101 will return to step 301. If the operation time has elapsed, the control unit 101 will proceed to step 311.

In step 311, the control unit 101 detects a corresponding long-term reference emotion value stored in the memory 113 and initializes the detected long-term reference emotion value to the short-term reference emotion value stored in the short-term memory unit 117.

In step 313, the control unit 101 determines whether a condition for terminating the operation of the long-term memory unit 119 is met. If the condition is not met, the control unit 101 will return to step 301. If the condition is met, the control unit 101 will proceed to step 315. For example, the condition can be a set number of operations of the short-term memory unit 117. If the number of operations of the short-term memory unit 117 is less than the set number of operations, the control unit 101 will increase the number of operations of the short-term memory unit 117 and return to step 301. If the short-term memory unit 117 completes the set number of operations, the control unit 101 will then proceed to step 315.

In step 315, the control unit 101 detects the short-term reference emotion values stored in the long-term memory unit 119 in step 305 to calculate a specific value using the detected short-term reference emotion values. The control unit 101 sets the calculated value as a new long-term reference emotion value, and stores the newly set long-term reference emotion value in the memory 113. For example, the control unit 101 can obtain an average value of the detected short-term reference emotion values and set the average value as the long-term reference emotion value. Subsequently, upon a request for initialization of a changed short-term reference emotion value, the control unit 101 initializes the short-term reference value stored in the short-term memory unit 117 using the corresponding long-term reference emotion value. Also, the control unit 101 initializes the counted number of operations of the short-term memory unit 117.

When another stimulus data is inputted by the user, the control unit 101 repeats the above steps from step 301.

Figure 4:
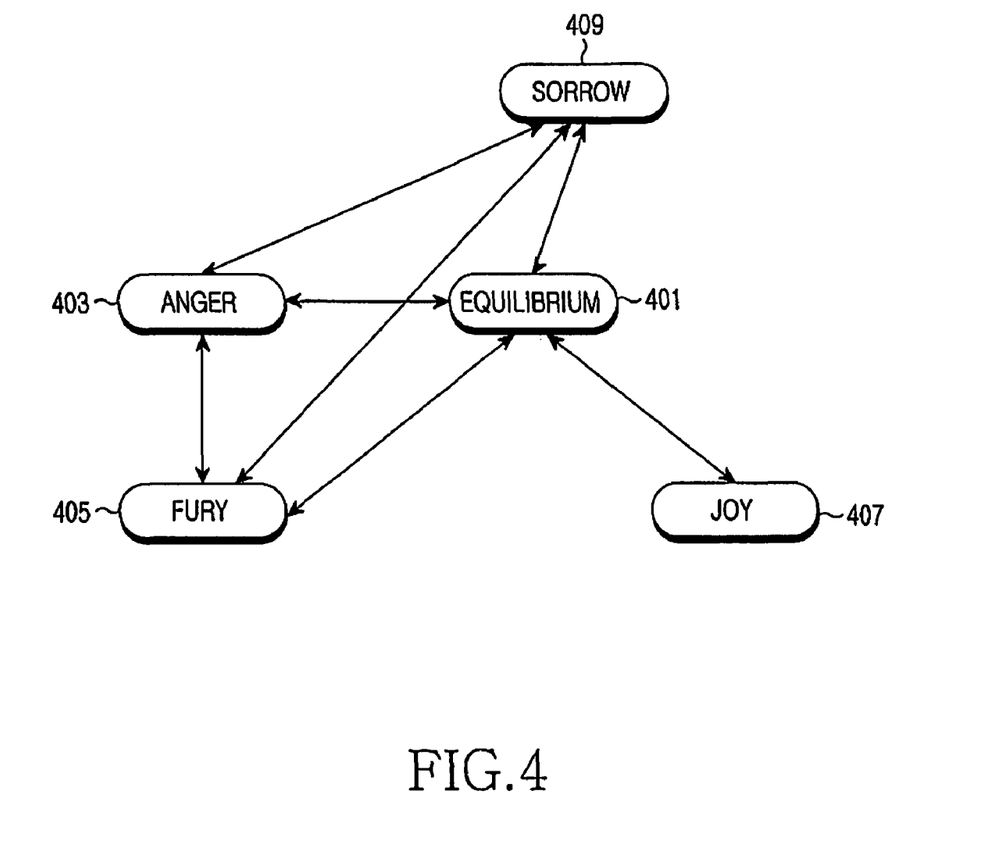
FIG. 4 is a view showing the emotional states of a sobot according to the present invention.

FIG. 4 is a view showing the relationship between diverse emotions of the sobot according to the present invention. Hereinafter, emotions of the sobot and mutual relationships between the emotions will be explained with reference to FIGS. 1 to 4.

Emotions of the sobot include equilibrium 401, anger 403, fury 405, joy 407 and sorrow 409. Emotional equilibrium 401 is related to other emotions, such as anger 403, fury 405, joy 407 and sorrow 409. Anger 403 arouses sorrow 409. When stimulus increasing anger is inputted to the sobot in anger emotional state 403, the emotion of the sobot may be changed to fury 405 from anger 403. Anger 403 is related to fury 405 and sorrow 409. Also, fury 405 can arouse sorrow 409.

The emotional changes of the sobot from anger 403 to fury 405 and from equilibrium 401 to joy 407 will be explained in detail with reference to FIGS. 5 to 10.

Figure 5A:
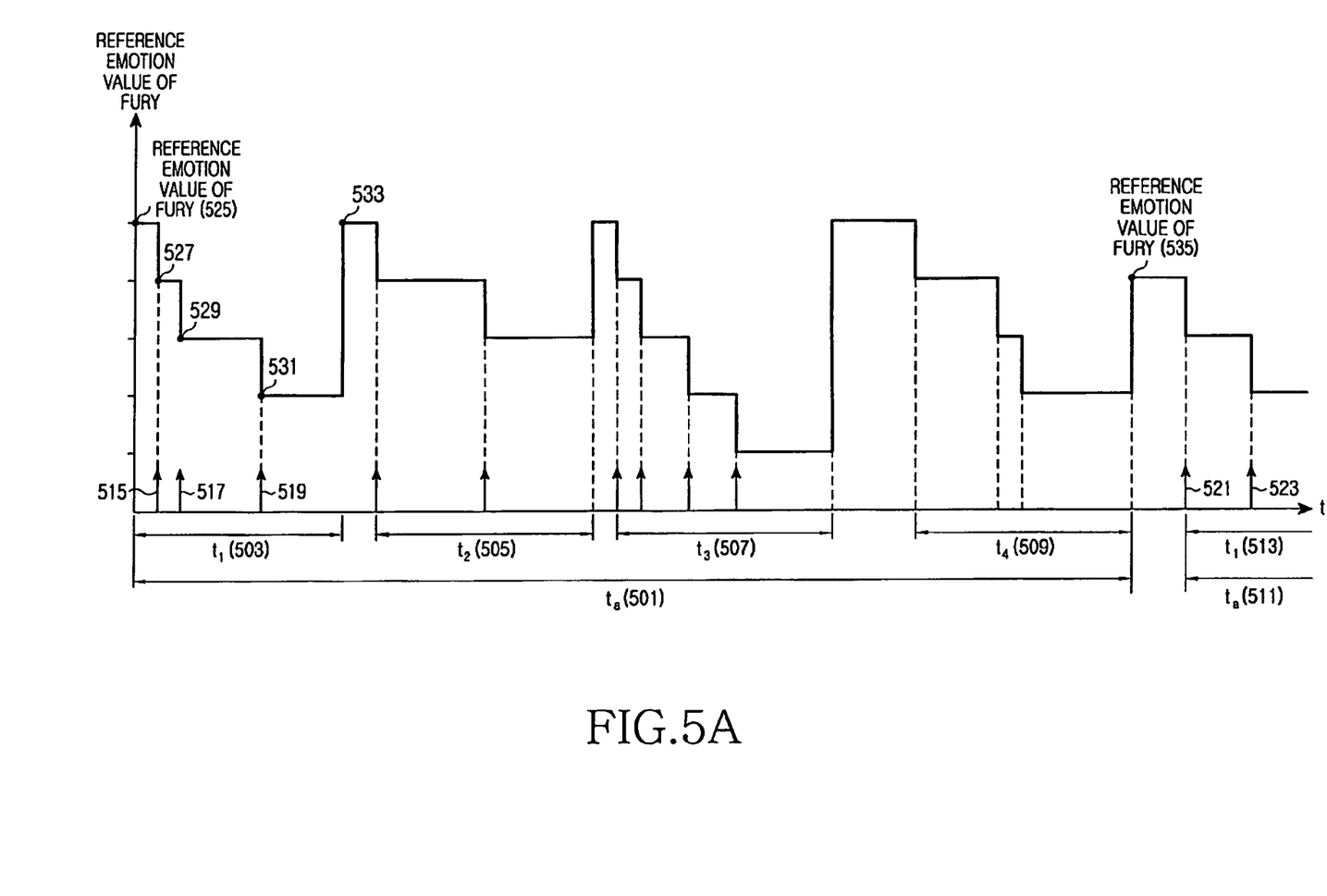
FIG. 5a is a view showing the change of a reference emotion value of fury according to a first embodiment of the present invention.
Figure 5B:
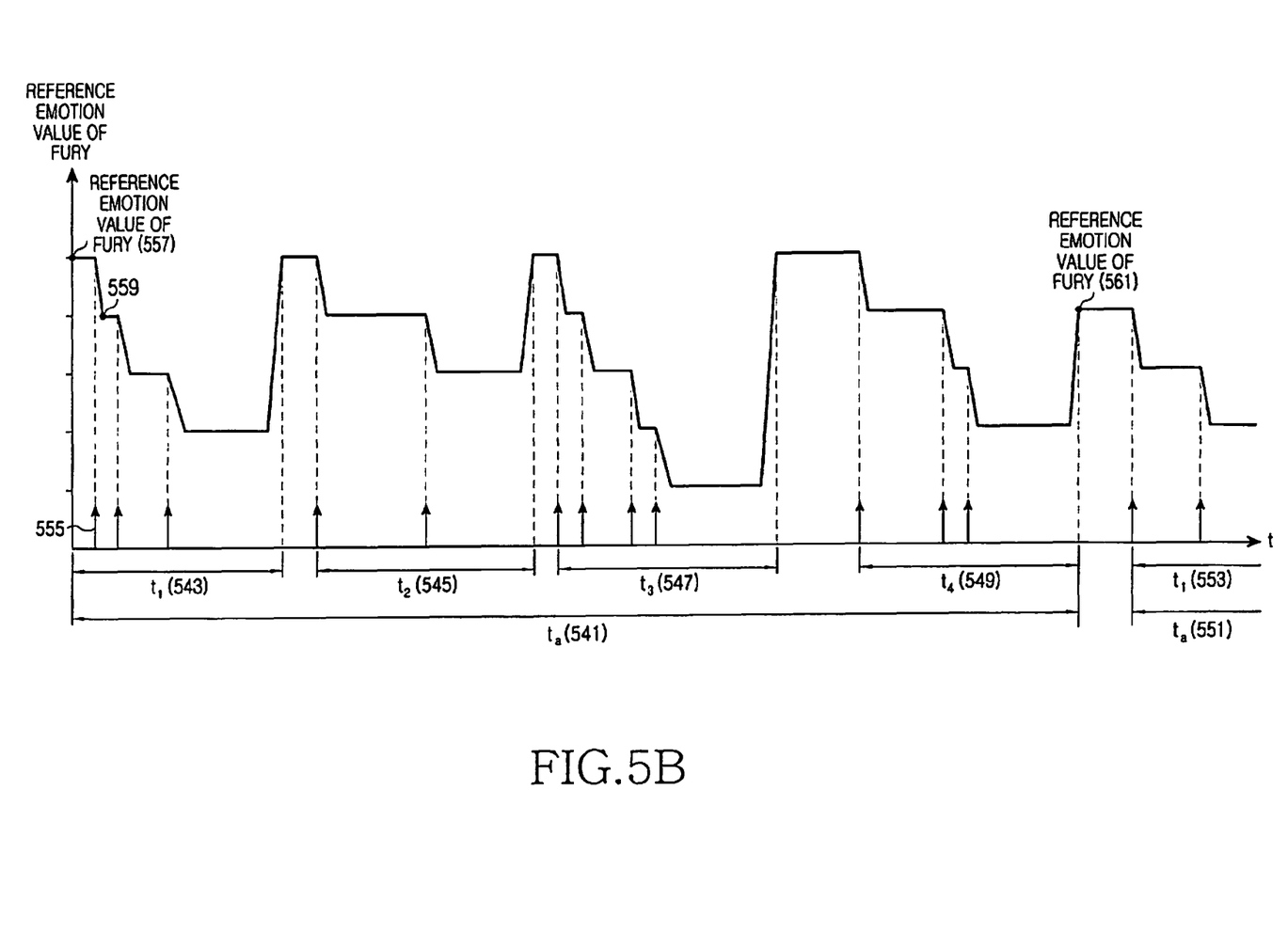
FIG. 5b is a view showing the change of a reference emotion value of fury according to a second embodiment of the present invention.

FIG. 5 is a view showing the change of a short-term reference emotion value of fury with the lapse of time according to the present invention. For the sake of convenience, it is assumed that the preset number of operations of the short-term memory unit 117 is four.

Referring to FIG. 5(a), $t_a$ 501 is the operation time of the long-term memory unit 119, while each of $t_1$ 503, $t_2$ 505, $t_3$ 507 and $t_4$ 509 is the operation time of the short-term memory unit 117. The times $t_1$ 503, $t_2$ 505, $t_3$ 507 and $t_4$ 509 are all equal as the operation times of the short-term memory unit 117. $t_a$ 501 is the sum of the operation times $t_1$ 503, $t_2$ 505, $t_3$ 507, $t_4$ 509 and the time intervals between the operations of the short-term memory unit 117. Supposing that each of $t_1$ 503, $t_2$ 505, $t_3$ 507 and $t_4$ 509 is four hours, and that a total of time intervals between each of $t_1$ 503 and $t_2$ 505, $t_2$ 505 and $t_3$ 507 and $t_3$ 507 and $t_4$ 509 is three hours, the operation time $t_a$ 501 of the long-term memory unit 119 will be fifteen hours ((3×4)+3=15).

Points 515, 517, 519, 521 and 523 refer to points of emotional changes of the sobot from anger to fury. When a stimulus arousing fury is inputted by the user, the control unit 101 generates stimulus data according to the intensity of the stimulus and applies the generated stimulus data to the current emotion value of fury, thereby increasing the emotion value of fury. The control unit 101 compares the increased emotion value of fury with a corresponding short-term reference emotion value stored in the short-term memory unit 117. If the increased emotion value is greater than the short-term reference emotion value, the control unit 101 will recognize that there is an emotional change at that time. Points 525, 527, 529, 531, 533 and 535 refer to short-term reference emotion values of fury, of which 525 and 533 are an initialized short-term reference emotion value of fury. In other words, a short-term reference emotion value which has changed during the operation of the short-term memory unit 117 is initialized to the value of point 525 or 533 after lapse of the operation time of the short-term memory unit 117. For example, if emotional changes occur three times during the operation time $t_1$ 503 of the short-term memory unit 117, the short-term reference emotion value of point 525 will be decreased by a decrease rate at each point of emotional change and finally changed to the value of point 531. However, after lapse of the operation time $t_1$ 503, the control unit 101 initializes the short-term reference emotion value of point 531 to the value of point 533.

The three short-term reference emotion values of points 527, 529 and 531 are those changed from the initial short-term reference emotion value of fury at the points of emotional changes 515, 517 and 519. More specifically, when the emotional change 515 occurs during the operation of the short-term memory unit 117, the control unit 101 searches for the initial short-term reference emotion value of fury (point 525) stored in the memory 113 and stores the initial short-term reference emotion value of fury both in the short-term memory unit 117 and in the long-term memory unit 119. The control unit 101 applies a decrease rate to the initial short-term reference emotion value of fury 525 to calculate the changed short-term reference emotion value of fury 527. The control unit 101 maintains the short-term reference emotion value of fury 527 until a subsequent emotional change 517 occurs. When the emotional change 517 occurs, the control unit 101 repeats the above process of decreasing the short-term reference emotion value of fury.

The short-term reference emotion value of fury is a reference value for changing the emotion of the sobot from anger to fury. If the current emotion value of fury of the sobot is greater than the short-term reference emotion value of fury, the control unit 101 will recognize that the current anger emotion of the sobot has changed to fury, and will output an image representing the fury emotion of the sobot.

As shown in FIG. 5(a), with the emotional changes 515, 517 and 519 during the operation time $t_1$ 503 of the short-term memory unit 117, the initial short-term reference emotion value of fury at point 525 is changed to the values of points 527, 529 and 531 successively.

After lapse of the operation time $t_1$ 503, the control unit 101 initializes the final short-term reference emotion value of point 531 to the short-term reference emotion value of fury at point 533. More specifically, when the operation time $t_1$ 503 elapses, the control unit 101 searches for a long-term reference emotion value of fury, which is the initial short-term reference emotion value of fury, in the memory 113, and sets the detected long-term reference emotion value as the initialized short-term reference emotion value of fury. Then the control unit 101 terminates the operation of the short-term memory unit 117. The short-term reference emotion value set through the above process is that of point 533. Since the short-term reference emotion value of fury, which changes during the operation time $t_1$ 503, is initialized after lapse of the operation time $t_1$ 503, the initialized short-term reference emotion value of fury can be applied at the beginning of the second operation time $t_2$ 505. In other words, the short-term reference emotion value of fury, which has been initialized to be equal to the corresponding long-term reference emotion value, is applied at the beginning of each operation time $t_2$ 505, $t_3$ 507 or $t_4$ 509.

When $t_a$ 501 (i.e. a time period from the first operation $t_1$ 503 to the fourth operation $t_4$ 509 of the short-term memory unit 117) elapses, the control unit 101 calculates a specific value using the short-term reference emotion values of fury which were stored in the long-term memory unit 119 at every point of emotional change during the period from the first operation $t_1$ 503 to the fourth operation $t_4$ 509. The control unit 101 sets the calculated value as a new long-term reference emotion value of fury. For example, the control unit 101 can obtain an average of the stored short-term reference emotion values and set the average as a new long-term reference emotion value of fury.

The above process of changing the short-term reference emotion value of fury will be explained in more detail with reference to FIG. 6. It is assumed that the initial short-term reference emotion value of point 525 is 5 and that the corresponding long-term reference emotion value of fury is 5. It is also assumed that the control unit 101 decreases the short-term reference emotion value of fury by one whenever an emotional change from anger to fury occurs.

If emotional changes occur three times (points 515, 517 and 519) during the operation time $t_1$ 503 of the short-term memory unit 117, the control unit 101 will store three short-term reference emotion values of fury, 5(601), 4 and 3, in the long-term memory unit 119. After lapse of the operation time $t_1$ 503, the control unit 101 initializes the short-term reference emotion value of fury at point 531 to be equal to the long-term reference emotion value of fury, thereby setting the short-term reference emotion value of fury to 5. If emotional changes occur twice during the operation time $t_2$ 505, the control unit 101 will store two short-term reference emotion values of fury, 5 and 4, in the long-term memory unit 119. After lapse of the operation time $t_2$ 505, the control unit 101 resets the short-term reference emotion value to 5. If emotional changes occur four times during the operation time $t_3$ 507, the control unit 101 will store four short-term reference emotion values 5, 4, 3 and 2 in the long-term memory unit 119. After lapse of the operation time $t_3$ 507, the control unit 101 initializes and sets the short-term reference emotion value to 5. If emotional changes occur three times during the operation time $t_4$ 509, the control unit 101 will store three short-term reference emotion values 5, 4 and 3 in the long-term memory unit 119. When the operation time $t_4$ 509 elapses (that is, when the operation time $t_a$ 501 elapses), the control unit 101 searches for the short-term reference emotion values of fury which were stored in the long-term memory unit 119 during the operation time $t_a$ 501, and calculates an average of the stored short-term reference emotion values of fury. The control unit 101 sets the calculated average as the long-term reference emotion value of fury.

Figure 6:
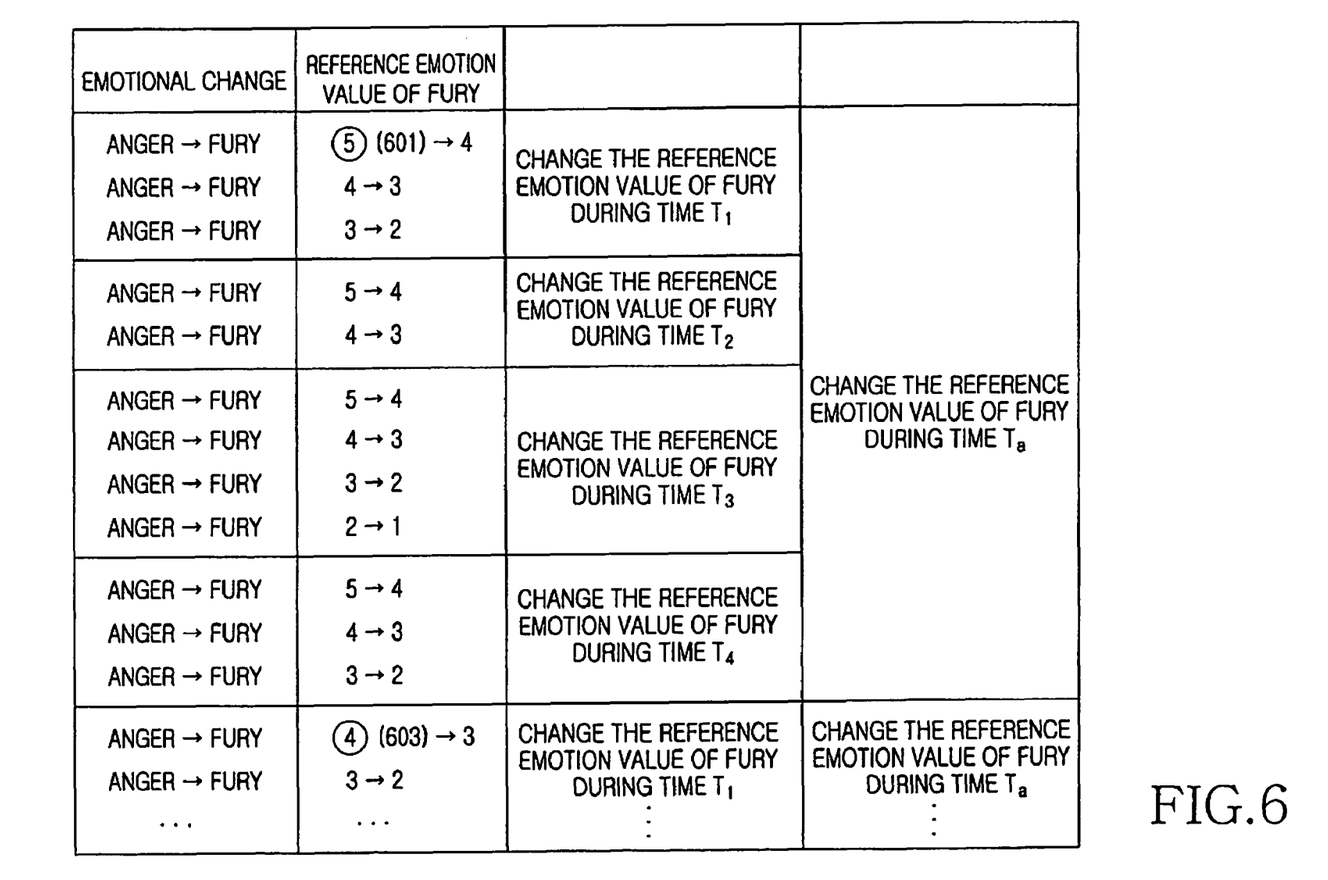
FIG. 6 is a table showing the reference emotion values of fury in FIG. 5 according to the present invention.

Referring to FIG. 6, the average of the stored short-term reference emotion values of fury is (5+4+3+5+4+4+5+4+3+2+5+4+3)/12=3.91. The control unit 101 can set an approximate value "4" as the long-term reference emotion value of fury. Also, when the operation time $t_4$ 509 elapses, the control unit 101 resets the short-term reference emotion value of fury at point 535 to be equal to the current long-term reference emotion value "4" (603). In other words, the control unit 101 applies the value "4" as the initial short-term reference emotion value of fury during the next operation time $t_a$ 511 of the long-term memory unit 119.

FIG. 5(*b*) shows the change of a short-term reference emotion value of fury with the lapse of time. Unlike FIG. 5(*a*), FIG. 5(*b*) shows that the short-term reference emotion value is decreased at a slope when an emotional change occurs and increased at a slope when initialized. In accordance with the present invention, the control unit 101 changes a short-term reference emotion value with the lapse of time as shown in FIG. 5(*a*) or 5(*b*).

Figure 7:
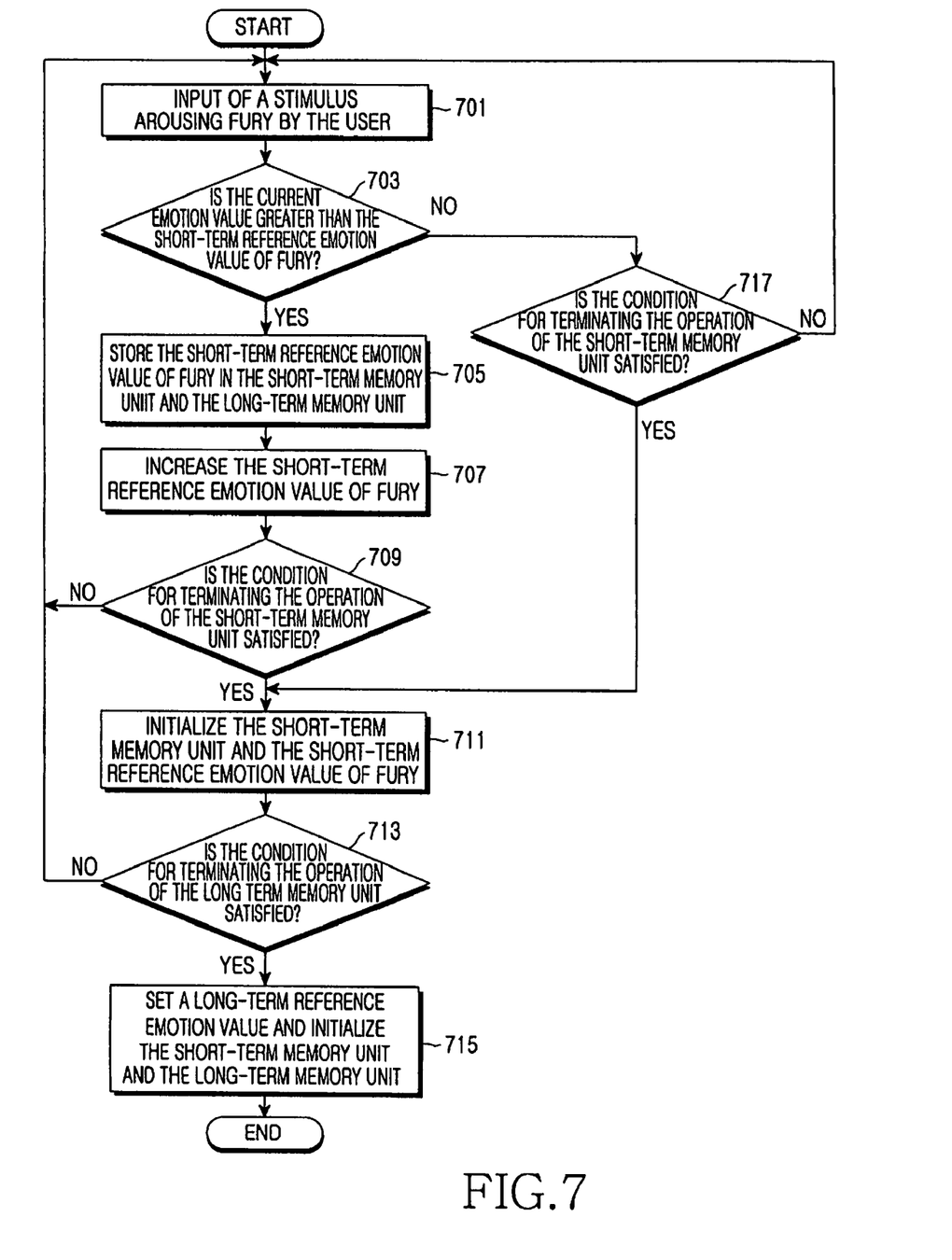
FIG. 7 is a flowchart showing a process of changing the emotion of a sobot to fury according to the present invention.

FIG. 7 is a flowchart showing a process of changing the emotion of the sobot according to the present invention. Hereinafter, this process will be explained in detail with reference to FIGS. 1 to 7.

When a stimulus arousing fury is inputted by the user in step 701, the control unit 101 generates stimulus data including the intensity of the stimulus, and searches for an emotion value of fury corresponding to the generated stimulus data among a plurality of predefined emotion values stored in the memory 113. The control unit 101 applies the stimulus data to the detected emotion value of fury, thereby increasing the emotion value of fury.

In step 703, the control unit 101 detects a corresponding short-term reference emotion value of fury in the memory 113, and compares the current (increased) emotion value of fury with the short-term reference emotion value of fury. If the current emotion value of fury is greater than the short-term reference emotion value, the control unit 101 will proceed to step 705. Otherwise, the control unit 101 will proceed to step 717.

In step 717, the control unit 101 determines whether a condition for terminating the operation of the short-term memory unit 117 is met. If the condition is not met, the control unit 101 will return to step 701. If the condition is met, the control unit 101 will proceed to step 711. For example, the condition can be an operation time of the short-term memory unit 117. If the operation time of the short-term memory unit 117 has not elapsed, the control unit 101 will return to step 701. If the operation time has elapsed, the control unit 101 will proceed to step 711.

In step 705, the control unit 101 activates the short-term memory unit 117 and counts the operation time of the short-term memory unit 117. Also, the control unit 101 detects the current short-term reference emotion value of fury from the memory 113, and stores the detected value both in the short-term memory unit 117 and in the long-term memory unit 119.

In step 707, the control unit 101 decreases the current short-term reference emotion value of fury in a preset reference emotion value changing manner. Also, the control unit 101 stores the decreased short-term reference emotion value of fury in the memory 113. Supposing that the current short-term reference emotion value of fury is "5" and that the short-term reference emotion value is set to be decreased by one, the control unit 101 will decrease the current short-term reference emotion value of fury to "4" and store the decreased short-term reference emotion value in the memory 113.

In step 709, the control unit 101 determines whether the condition for terminating the operation of the short-term memory unit 117 is met. If the condition is not met, the control unit 101 will return to step 701. If the condition is met, the control unit 101 will proceed to step 711. For example, the condition can be an operation time of the short-term memory unit 117. If the operation time of the short-term memory unit 117 has not elapsed, the control unit 101 will return to step 701. If the operation time has elapsed, the control unit 101 will proceed to step 711.

In step 711, the control unit 101 initializes the short-term reference emotion value of fury. More specifically, the control unit 101 detects a corresponding long-term reference emotion value of fury from the memory 113, and then changes the short-term reference emotion value stored in the short-term memory unit 117 to be equal to the detected long-term reference emotion value.

In step 713, the control unit 101 determines whether a condition for terminating the operation of the long-term memory unit 119 is met. If the condition is not met, the control unit 101 will return to step 701. If the condition is met, the control unit 101 will proceed to step 715. For example, the condition can be a set number of operations of the short-term memory unit 117. If the number of operations of the short-term memory unit 117 is less than the set number of operations, the control unit 101 will increase the number of operations of the short-term memory unit 117 and return to step 701. If the short-term memory unit 117 completes the number of operations, the control unit 101 will then proceed to step 715.

In step 715, the control unit 101 detects the short-term reference emotion values stored in the long-term memory unit 119 in step 705, and calculates a specific value using the detected short-term reference emotion values. The control unit 101 sets the calculated value as a new long-term reference emotion value. For example, the control unit 101 can obtain an average value of the detected short-term reference emotion values and set the average value as the long-term reference emotion value. Subsequently, upon a request for initialization of a changed short-term reference emotion value, the control unit 101 initializes the short-term reference value stored in the short-term memory unit 117 using the corresponding long-term reference emotion value. Also, the control unit 101 initializes the counted number of operations of the short-term memory unit 117.

When another stimulus data is subsequently inputted by the user, the control unit 101 repeats the above steps from step 701.

Figure 8:
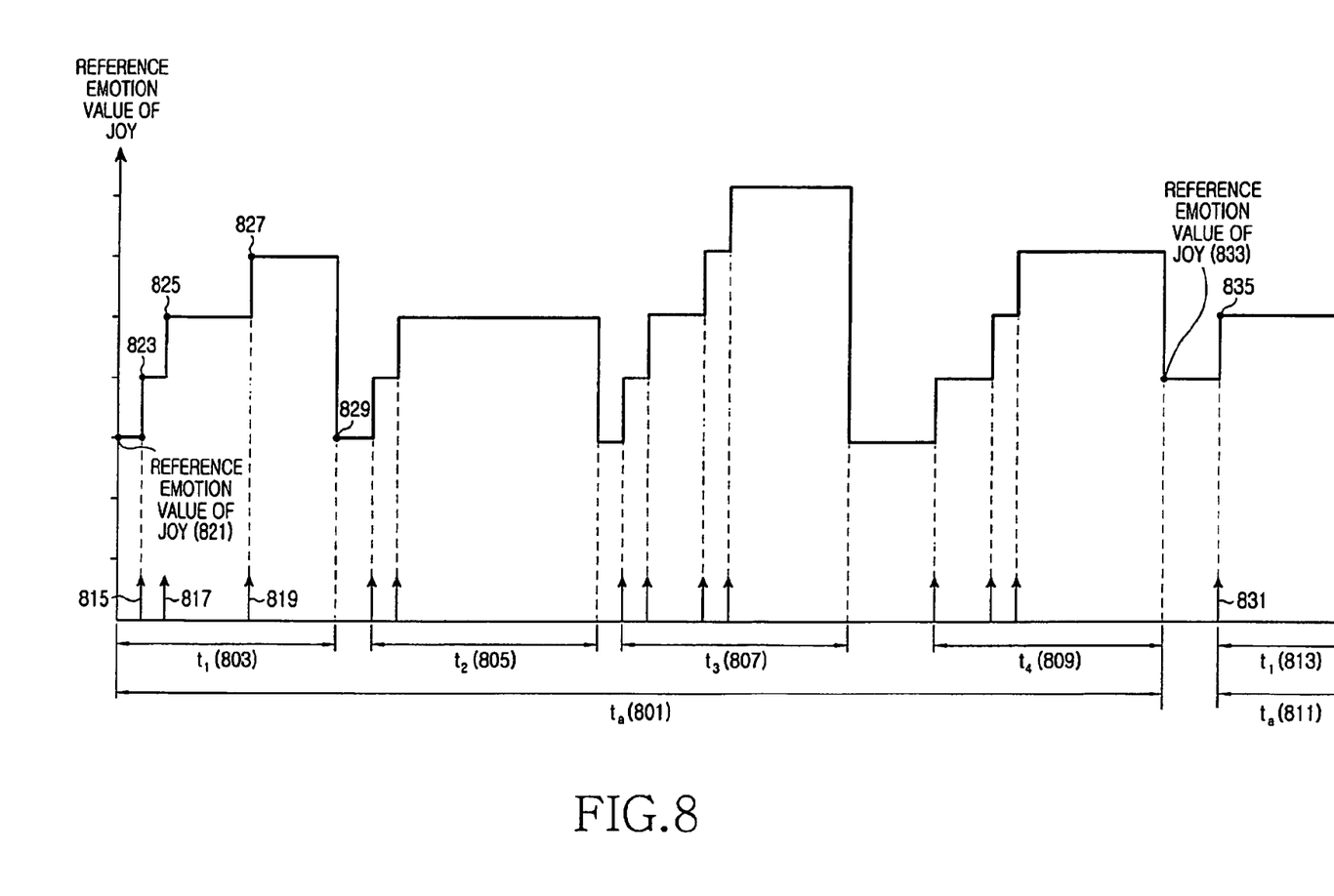
FIG. 8 is a view showing the change of a reference emotion value of joy according to the present invention.

FIG. 8 is a view showing the change of a short-term reference emotion value of joy according to the present invention. Referring to FIG. 8, $t_a$ 801 is the operation time of the long-term memory unit 119, while each of $t_1$ 803, $t_2$ 805, $t_3$ 807 and $t_4$ 809 is the operation time of the short-term memory unit 117. The times $t_1$ 803, $t_2$ 805, $t_3$ 807 and $t_4$ 809 are all equal as the operation times of the short-term memory unit 117. Points 815, 817, 819 and 831 refer to points of emotional changes of the sobot from equilibrium to joy. When a stimulus arousing joy is inputted by the user, the control unit 101 generates stimulus data according to the intensity of the stimulus and applies the generated stimulus data to the current emotion value of joy, thereby increasing the emotion value of joy. The control unit 101 compares the increased emotion value of joy with a corresponding short-term reference emotion value of joy. If the increased emotion value of joy is greater than the short-term reference emotion value, the control unit 101 will recognize that there is an emotional change at that time.

Points 821, 823, 825, 827, 829, 833 and 835 refer to short-term reference emotion values of joy, of which 821 and 829 are an initialized short-term reference emotion value of joy. In other words, a short-term reference emotion value of joy which has changed during the operation of the short-term memory unit 117 is initialized to the value of point 821 or 829 after lapse of the operation time of the short-term memory unit 117. For example, if emotional changes occur several times during the operation time $t_1$ 803 of the short-term memory unit 117, the short-term reference emotion value of joy at point 821 will be increased at each point of emotional change and finally changed to the value of point 827. However, after lapse of the operation time $t_1$ 803, the control unit 101 initializes the short-term reference emotion value of point 827 to the value of point 829.

The three short-term reference emotion values of joy at points 823, 825 and 827 are those changed from the initial short-term reference emotion value of joy at the points of emotional changes 815, 817 and 819. More specifically, when the emotional change 815 occurs during the operation of the short-term memory unit 117, the control unit 101 stores the initial short-term reference emotion value of joy at point 821 in the long-term memory unit 119. The control unit 101 applies an increase rate to the initial short-term reference emotion value of joy 821, thereby increasing the short-term reference emotion value of joy to the value of point 823. The control unit 101 maintains the short-term reference emotion value of joy 823 until a subsequent emotional change 817 occurs. When the subsequent emotional change occurs, the control unit 101 repeats the above process of increasing the short-term reference emotion value of joy.

The short-term reference emotion value of joy is a reference value for changing the emotion of the sobot from equilibrium to joy. If the current emotion value of joy of the sobot is greater than the short-term reference emotion value of joy, the control unit 101 will recognize that the current emotional equilibrium of the sobot has changed to joy, and will output an image representing the joyful emotion of the sobot.

As shown in FIG. 8, with the sequential emotional changes 815, 817 and 819 during the operation time $t_1$ 803 of the short-term memory unit 117, the initial short-term reference emotion value of joy at point 821 is changed to the values at points 823, 825 and 827 successively.

After lapse of the operation time $t_1$ 803, the control unit 101 initializes the final short-term reference emotion value of joy at point 827 to the value at point 829. More specifically, when the operation time $t_1$ 803 elapses, the control unit 101 searches for a long-term reference emotion value of joy, which is the initial short-term reference emotion value of joy, in the memory 113, and changes the short-term reference emotion value of joy to be equal to the detected long-term reference emotion value. The changed short-term reference emotion value of joy is that of point 829. Since the short-term reference emotion value of joy which changes during the operation time $t_1$ 803 is initialized at the end the operation time $t_1$ 803, the initialized short-term reference emotion value of joy can be applied at the beginning of the second operation time $t_2$ 805. In other words, the short-term reference emotion value of joy which has been initialized to be equal to the corresponding long-term reference emotion value is applied at the beginning of each operation time $t_2$ 805, $t_3$ 807 or $t_4$ 809 included in the operation time $t_a$ 801.

When $t_a$ 801 (i.e. a time period from the first operation $t_1$ 803 to the fourth operation $t_4$ 809 of the short-term memory unit 117) elapses, the control unit 101 calculates a specific value using the short-term reference emotion values of joy which were stored in the long-term memory unit 119 at every point of emotional change during the period from the first operation $t_1$ 803 to the fourth operation $t_4$ 809. The control unit 101 sets the calculated value as a new long-term reference emotion value of joy. For example, the control unit 101 can obtain an average of the stored short-term reference emotion values and set the average as a new long-term reference emotion value of joy.

The above process of changing the short-term reference emotion value of joy will be explained in more detail with reference to FIG. 9. It is assumed that the initial short-term reference emotion value of point 821 is 3 and that the corresponding long-term reference emotion value of joy is 3. It is also assumed that the control unit 101 increases the short-term reference emotion value of joy by one whenever an emotional change to joy occurs.

If emotional changes occur three times (points 815, 817 and 819) during the operation time $t_1$ 803 of the short-term memory unit 117, the control unit 101 will store three short-term reference emotion values of joy, 3(901), 4 and 5, in the long-term memory unit 119. After lapse of the operation time $t_1$ 803, the control unit 101 initializes the final short-term reference emotion value to be equal to the long-term reference emotion value of joy, thereby setting the short-term reference emotion value of joy to 3. If emotional changes occur twice during the operation time $t_2$ 805, the control unit 101 will store two short-term reference emotion values of joy, 3 and 4, in the long-term memory unit 119. After lapse of the operation time $t_2$ 805, the control unit 101 sets the short-term reference emotion value again to 3. If emotional changes occur four times during the operation time $t_3$ 807, the control unit 101 will store four short-term reference emotion values 3, 4, 5 and 6 in the long-term memory unit 119. After lapse of the operation time $t_3$ 807, the control unit 101 initializes and sets the short-term reference emotion value to 3. If emotional changes occur three times during the operation time $t_4$ 809, the control unit 101 will store three short-term reference emotion values 3, 4 and 5 in the long-term memory unit 119. When the operation time $t_4$ 809 elapses (that is, when the operation time $t_a$ 801 elapses), the control unit 101 searches for the short-term reference emotion values of joy which were stored in the long-term memory unit 119 during the operation time $t_a$ 801, and calculates an average of the stored short-term reference emotion values of joy. The control unit 101 sets the calculated average as the long-term reference emotion value of joy.

Figure 9:
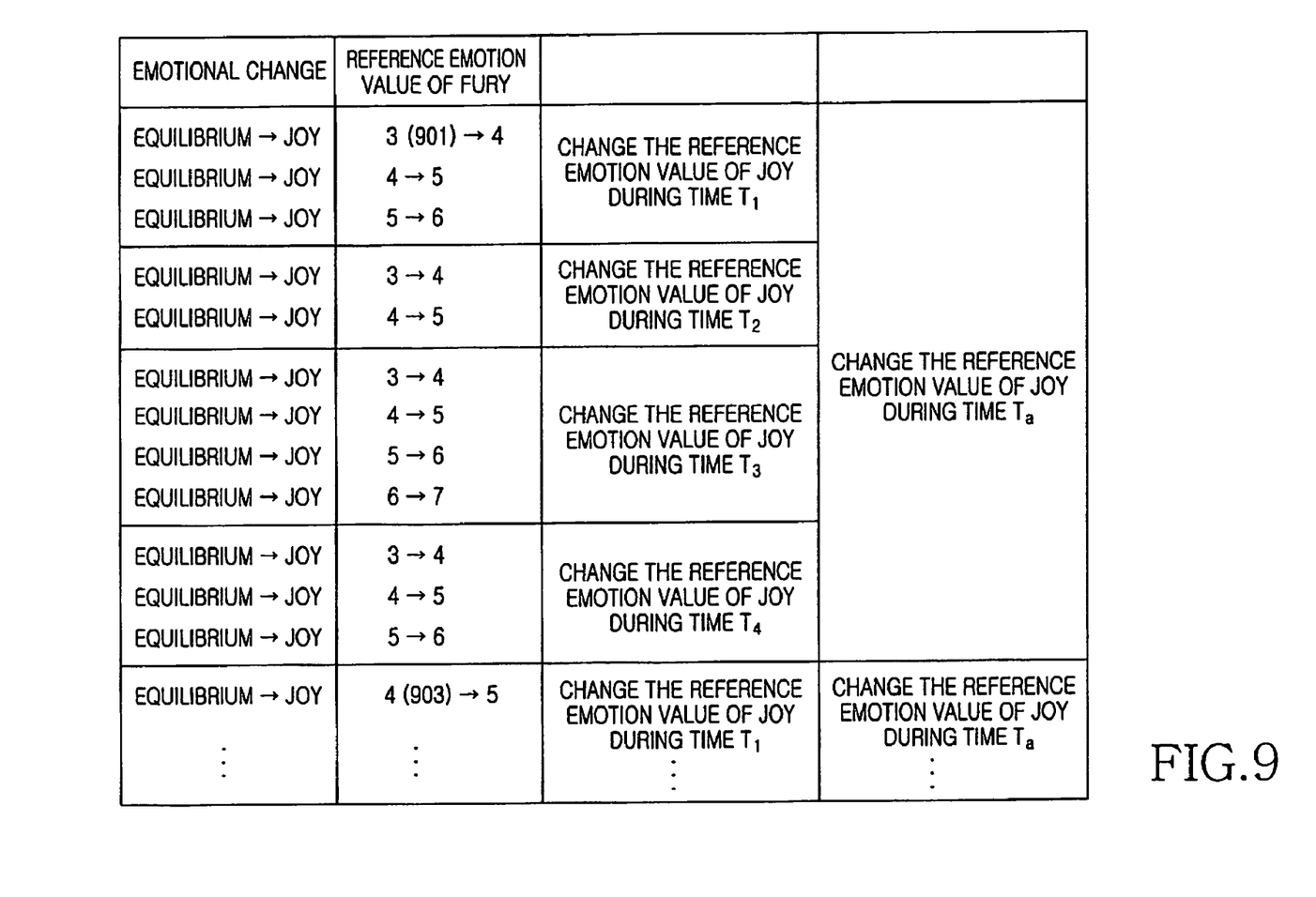
FIG. 9 is a table showing the reference emotion values of joy in FIG. 8 according to the present invention.

Referring to FIG. 9, the average of the stored short-term reference emotion values of joy is (3+4+5+3+4+3+4+5+6+3+4+5)/12=4.08. The control unit 101 can set an approximate value "4" as the long-term reference emotion value of joy. Also, when the operation time $t_4$ 809 elapses, the control unit 101 resets the short-term reference emotion value of joy to be equal to the current long-term reference emotion value 4 (903) In other words, the control unit 101 applies the value "4" as the initial short-term reference emotion value of joy during the next operation time $t_a$ 811 of the long-term memory unit 119.

Figure 10:
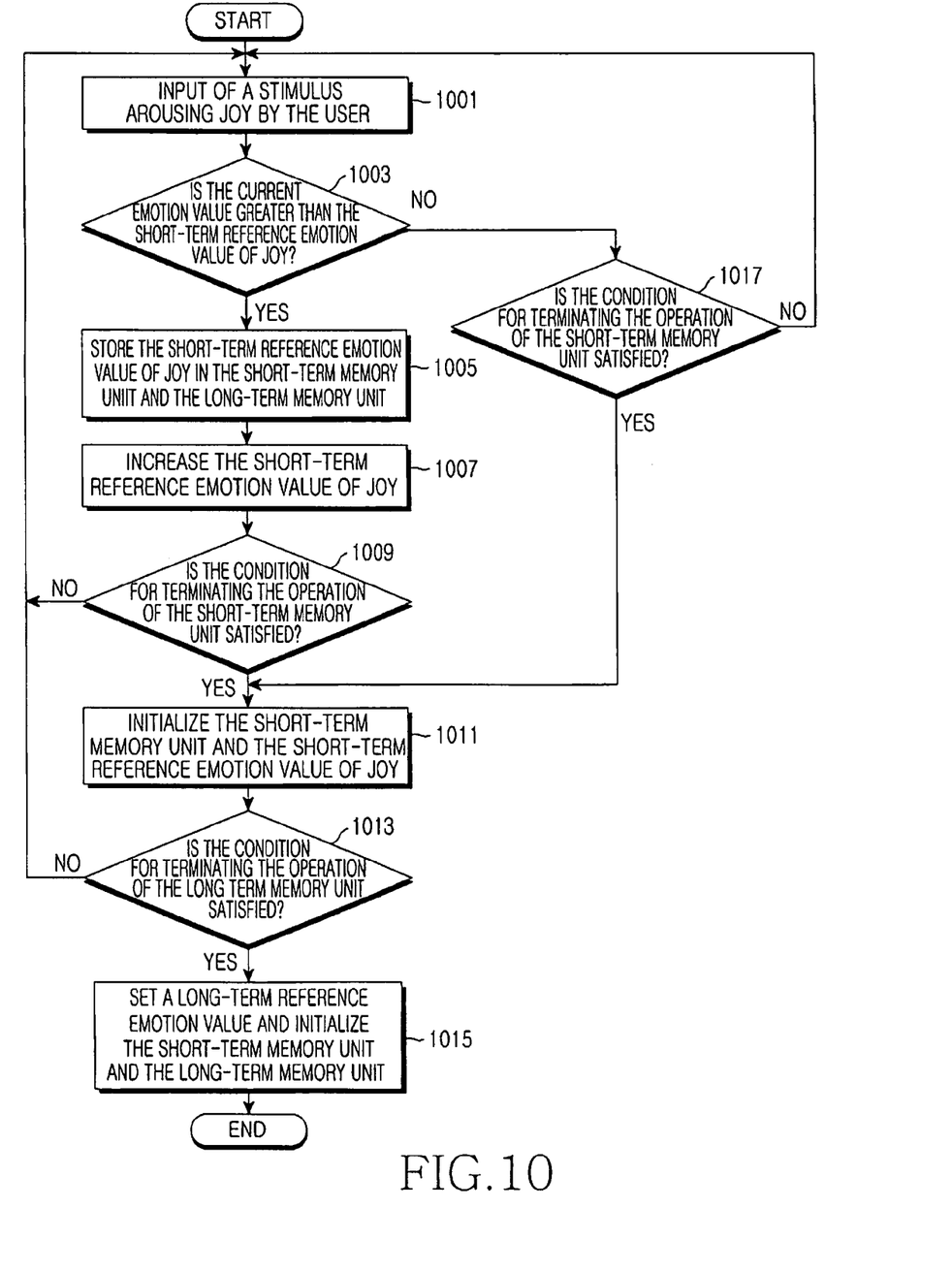
FIG. 10 is a flowchart showing a process of changing the emotion of a sobot to joy according to a preferred embodiment of the present invention.

FIG. 10 is a flowchart showing a process of changing the emotion of the sobot according to the present invention. Hereinafter, this process will be explained in detail with reference to FIGS. 1 to 10.

When a stimulus arousing joy is inputted by the user in step 1001, the control unit 101 generates stimulus data including the intensity of the stimulus and searches for an emotion value of joy corresponding to the generated stimulus data among a plurality of predefined emotion values stored in the memory 113. The control unit 101 applies the stimulus data to the detected emotion value of joy, thereby increasing the emotion value of joy.

In step 1003, the control unit 101 detects a corresponding short-term reference emotion value of joy in the memory 113, and compares the current (increased) emotion value of joy with the short-term reference emotion value. If the current emotion value of joy is greater than the short-term reference emotion value, the control unit 101 will proceed to step 1005. Otherwise, the control unit 101 will proceed to step 1017.

In step 1017, the control unit 101 determines whether a condition for terminating the operation of the short-term memory unit 117 is met. If the condition is not met, the control unit 101 will return to step 1001. If the condition is met, the control unit 101 will proceed to step 1011. For example, the condition can be an operation time of the short-term memory unit 117. If the operation time of the short-term memory unit 117 has not elapsed, the control unit 101 will return to step 1001. If the operation time has elapsed, the control unit 101 will proceed to step 1011.

In step 1005, the control unit 101 activates the short-term memory unit 117 and counts the operation time of the short-term memory unit 117. Also, the control unit 101 detects the current short-term reference emotion value of joy from the memory 113, and stores the detected value both in the short-term memory unit 117 and in the long-term memory unit 119.

In step 1007, the control unit 101 increases the current short-term reference emotion value of joy by an increase rate. Also, the control unit 101 stores the increased short-term reference emotion value of joy in the memory 113. Supposing that the current short-term reference emotion value of joy is "3" and that the short-term reference emotion value is set to be increased by one, the control unit 101 will increase the current short-term reference emotion value of joy to "4" and store the increased short-term reference emotion value in the memory 113.

In step 1009, the control unit 101 determines whether the condition for terminating the operation of the short-term memory unit 117 is met. If the condition is not met, the control unit 101 will return to step 1001. If the condition is met, the control unit 101 will proceed to step 1011. For example, the condition can be an operation time of the short-term memory unit 117. If the operation time of the short-term memory unit 117 has not elapsed, the control unit 101 will return to step 1001. If the operation time has elapsed, the control unit 101 will proceed to step 1011.

In step 1011, the control unit 101 initializes the short-term reference emotion value of joy. More specifically, the control unit 101 detects a corresponding long-term reference emotion value of joy from the memory 113, and then changes the short-term reference emotion value of joy to be equal to the detected long-term reference emotion value.

In step 1013, the control unit 101 determines whether a condition for terminating the operation of the long-term memory unit 119 is met. If the condition is not met, the control unit 101 will return to step 1001. If the condition is met, the control unit 101 will proceed to step 1015. For example, the condition can be a set number of operations of the short-term memory unit 117. If the number of operations of the short-term memory unit 117 is less than the set number of operations, the control unit 101 will increase the number of operations of the short-term memory unit 117 and return to step 1001. If the short-term memory unit 117 completes the set number of operations, the control unit 101 will then proceed to step 1015.

In step 1015, the control unit 101 detects the short-term reference emotion values stored in the long-term memory unit 119 in step 1005, and calculates a specific value using the detected short-term reference emotion values. The control unit 101 sets the calculated value as a new long-term reference emotion value. For example, the control unit 101 can obtain an average value of the detected short-term reference emotion values of joy and set the average value as the long-term reference emotion value of joy. Subsequently, upon a request for initialization of a changed short-term reference emotion value of joy, the control unit 101 initializes the short-term reference value to be equal to the corresponding long-term reference emotion value. When one or more emotional changes occur during the operation time of the short-term memory unit 117, the sobot terminal changes the short-term reference emotion value corresponding to the current emotion. When one or more emotional changes occur during the operation time of the long-term memory unit 119, the sobot terminal stores the short-term reference emotion values changed with the emotional changes, and initializes the corresponding long-term reference emotion value using the stored short-term reference emotion values. Also, the control unit 101 initializes the counted number of operations of the short-term memory unit 117.

When another stimulus data is subsequently inputted by the user, the control unit 101 repeats the above steps from step 1001.

The sobot terminal can change the emotion of the sobot more naturally through the above process. The sobot terminal applies the results of an emotional change to a short-term reference emotion value corresponding to the current emotion of the sobot, thereby enabling the natural change of emotion of the sobot according to the stimulus inputted by the user.

As explained above, a sobot terminal capable of changing the emotion of a sobot according to the present invention can eliminate feelings of rejection which may be aroused during communication with a sobot changing its emotion mechanically. In addition, after each emotional change, the sobot terminal can apply the results of the emotional change to the current emotion of the sobot.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof. For example, when the emotion of the sobot is changed from equilibrium to joy by the stimulus data inputted by the user, the sobot terminal increases the short-term reference emotion value of joy. However, the short-term reference emotion value of joy can be decreased according to the type of stimulus.

What is claimed is:

1. A method for changing an emotion of a software robot (sobot), comprising a control unit executing the steps of:
   generating stimulus data corresponding to a user's input;
   increasing an emotion value representing a current emotion of the sobot according to the stimulus data generated during a period of time;
   when the increased emotional value is greater than a preset short-term reference emotion value, recognizing that the sober is experiencing the emotion corresponding to the increased emotion value, storing the short-term reference emotion value both in a short-term memory unit and in a long-term memory unit, and changing and resetting the short-term reference emotion value;
   when a condition for terminating the operation of the short-term memory unit is not met, repeating the steps of increasing the emotion value and resetting the short-term reference emotion value;
   when the condition for terminating the operation of the short-term memory unit is met, initializing the short-term reference emotion value to be equal to a previously stored long-term reference emotion value;
   when a condition for terminating the operation of the long-term memory unit is not met, repeating the steps of increasing the emotion value, resetting the short-term reference emotion value and initializing the short-term reference emotion value; and
   when the condition for terminating the operation of the long-term memory unit is met, calculating the long-term reference emotion value using one or more short-term reference emotion values stored in the long-term memory unit and storing the calculated long-term reference emotion value.

2. The method according to claim 1, wherein the condition for terminating the operation of the short-term memory unit is a set operation time of the short-term memory unit.

3. The method according to claim 1, wherein the condition for terminating the operation of the long-term memory unit is a set number of operations of the short-term memory unit.

4. The method according to claim 1, wherein resetting the short-term reference emotion value includes:
   when the increased emotion value is greater than the short-term reference emotion value, recognizing that the sobot is experiencing the emotion corresponding to the increased emotion value and storing the short-term reference emotion value; and increasing the short-term reference emotion value by an increase rate and resetting the short-term reference emotion value.

5. The method according to claim 4, wherein resetting the short-term reference emotion value includes:
   when the increased emotion value is greater than the short-term reference emotion value, recognizing that the sobot is experiencing the emotion corresponding to the increased emotion value and storing the short-term reference emotion value; and decreasing the short-term reference emotion value by a decrease rate and resetting the short-term reference emotion value.

6. The method according to claim 1, wherein storing the long-term reference emotion value includes:
   calculating an average of the stored short-term reference emotion values; and
   storing the calculated average as the long-term reference emotion value.

* * * * *